R. S. MERSHON.

Watch Regulator.

No. 892. Reissued Feb. 7, 1860.

Witnesses:

E Cohen

J. Hirsch

Inventors:

Ralph S. Mershon

John M. Harper per atty A. B. Stoughton

N. PETERS, Photo-Lithographer, Washington, D. C.

UNITED STATES PATENT OFFICE.

R. S. MERSHON AND J. M. HARPER, OF PHILADELPHIA, PENNSYLVANIA, ASSIGNEES OF RALPH S. MERSHON.

IMPROVED REGULATOR FOR TIME-KEEPERS.

Specification forming part of Letters Patent No. 23,810, dated April 26, 1859; Reissue No. 892, dated February 7, 1860.

*To all whom it may concern:*

Be it known that RALPH S. MERSHON, of the city and county of Philadelphia and State of Pennsylvania, did invent certain new and useful Improvements in Regulators for Time-Keepers, (for which Letters Patent of the United States were granted and issued, to RALPH S. MERSHON and JOHN M. HARPER on the 26th of April, 1859, as the assignees of the entire right of said MERSHON;) and we do hereby declare that the following is a full, clear, and exact description of the construction and operation of the same, reference being had to the accompanying drawings, making a part of this specification, in which—

Figure 1:
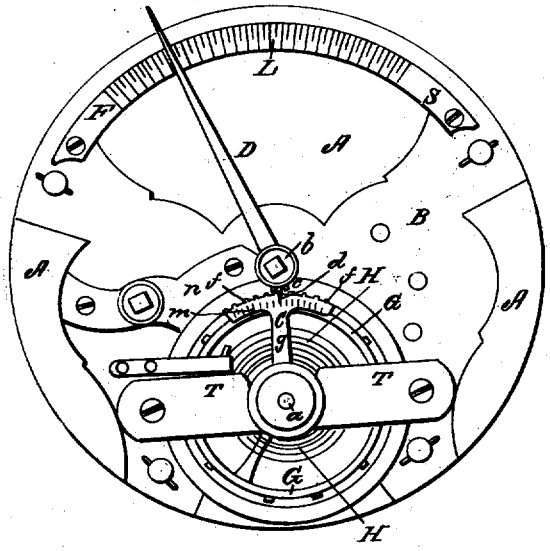
Figure 2:
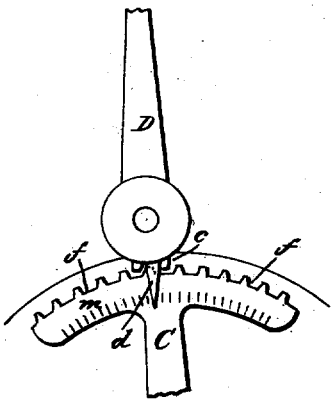

Figure 1 represents a top plan of a portion of a watch, showing the application of the improvement of the said MERSHON applied to it; and Fig. 2 represents a porion of the regulator detached, and on an enlarged scale.

Similar letters of reference, where they occur in the separate figures, denote like parts of the contrivance in both of them.

The invention of the said RALPH S. MERSHON consists in the application to watches, or such other time-pieces as have their beats or vibrations governed by a balance and hair spring, of a compound regulator composed of two or more movable toothed segments, that may work together or independent of each other, so as to produce a less or greater sensible effect upon the hair-spring, as may be desired.

To enable others skilled in the art to make and use the invention of the said RALPH S. MERSHON, we will proceed to describe the same with reference to the drawings.

A represents the pillar-plate of a watch-movement. B represents the upper plate, and C represents a toothed segment moving around the point *a*, as a center, which point *a* may be a shaft, and held or supported by the balance-bridge T.

D represents the regulator, which turns on its bearing at *b*. Said regulator has upon its hub one or more teeth, C, which project far enough from said hub to mesh or catch into or between the teeth *f* of the segment C, and when so placed to move said segment, as will be hereinafter explained.

G represents a balance, and H a balance or hair spring.

L represents a scale by which the regulator D is adjusted, and over or past which it may move. There may be a scale, *m*, on the segment C and a stationary indicator, *d*, on the plate *n* to govern its movements by; but these may be dispensed with, inasmuch as when the segment C is moved independently of the regulator, said regulator is stationary, and consequently its tooth or teeth *c* is also stationary, and the tooth can then be a stationary indicator, in the same practical sense that *d* is, and serving a similar purpose. So, too, may the scale *m* be dispensed with, and the teeth *f* be used as a scale for defining the extent of movement of the segment C. Either answers the purpose; but as there is no necessity of duplicating parts to accomplish a single purpose, and as the teeth of the two segments can effect the same objects that the indicator *d* and scale *m* do, and in addition to this perform another important feature, I prefer to dispense with the indicator *d* and scale *m* and use the teeth of the segment *c* and regulator D instead. Both, however, may be used if so preferred, but there is, as above stated, no necessity of duplicating these indicating points when they exist in the teeth themselves of the two segments.

We have shown two teeth, *c*, on the hub of the indicator D. But one of them is in action at a time, and hence there may be but one, the only difference between having one and two being that, with two the indicator D would have to be moved farther to throw it out of mesh with the segment C than when one is used, or, in other words, two remain longer in mesh than a single one would, and in some watch-movements one may be preferable to two teeth.

The operation of this regulator is as follows: If the regulator D be turned upon its pivot *b* toward F the segment C will turn in an opposite direction and the scale L will show the extent of movement of said regulator. Now, if the distance of the acting tooth *c* and the scale L from the center *b*, respectively, be as 1 to 7 then the arc C will have moved one-seventh of the movement of the regulator D upon the scale L; and as the tension of the balance-spring is adjusted by the action of the pin *g* on said segment C, and as the pin *g* is secured at a distance from the point *a* which is equal to one-half of the radius of the segment C, it follows that the movement of the regulator D upon the scale L only affects the balance spring one-fourteenth of its movement, thus affording the means of adjusting the spring to almost any desired accuracy. By turning the regulator D far enough to bring the tooth *c* that is acting out of mesh with the segment-teeth *f*, then the segment C can be moved independently of the regulator D and act like a simple regulator; and the tooth on the regulator which is thus taken out of mesh with the teeth *f* may designate the point or extent of its independent movement, the teeth *f* being the movable portion of this indicating device. The object of having the regulator to mesh with the segment C is that a much more minute regulation may be made, inasmuch as however slight the movement of the indicator D may be, it only communicates one-fourteenth of that movement to the pin *g* which acts on the balance-spring. Of course these proportions of parts are assumed to more clearly describe their action, but other proportions may be used, the object being to have a perceptible movement of the regulator D communicate an imperceptible (almost) movement of the pin that controls the hair or balance spring. For large adjustments the segments can be moved independently of the regulator, and thus the necessity of shortening or altering the hair-spring is avoided, which would have to be done if the compound regulator only could be used.

Having thus fully described the nature and object of this improvement, what is claimed as the invention of RALPH S. MERSHON, and desired to be secured by Letters Patent, is—

1. The application to watches and such time-pieces as have their vibrations governed by a balance and hair spring of a compound regulator composed of two or more segments, constructed and operating substantially as described.

2. The combination of said compound regulator with one or more indicating devices, by which the movement of said regulator may be adjusted or defined, substantially as described.

R. S. MERSHON.
JOHN M. HARPER.

Witnesses:
HENRY HARPER,
JOHN MADDER, Jr.